US010199960B2

(12) United States Patent
Yamasaki

(10) Patent No.: US 10,199,960 B2
(45) Date of Patent: Feb. 5, 2019

(54) VIBRATION WAVE MOTOR

(71) Applicant: CANON KABUSHIKI KAISHA, Tokyo (JP)

(72) Inventor: Ryo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 433 days.

(21) Appl. No.: 15/158,900

(22) Filed: May 19, 2016

(65) Prior Publication Data

US 2016/0352256 A1 Dec. 1, 2016

(30) Foreign Application Priority Data

May 28, 2015 (JP) .................................. 2015-108338

(51) Int. Cl.
*H02N 2/00* (2006.01)
*H02N 2/02* (2006.01)

(52) U.S. Cl.
CPC ........... *H02N 2/0055* (2013.01); *H02N 2/026* (2013.01)

(58) Field of Classification Search
CPC ............................. H02N 2/0055; H02N 2/026
USPC .................. 310/323.04, 323.09, 323.16, 328
See application file for complete search history.

(56) References Cited

U.S. PATENT DOCUMENTS

| 6,242,846 B1 * | 6/2001 | Ashizawa | ........... H01L 41/0906 310/323.02 |
| 2018/0088298 A1 * | 3/2018 | Nishitani | ................. G02B 7/04 |

FOREIGN PATENT DOCUMENTS

| JP | 2014-212682 A | 11/2014 | |
| JP | 2016226105 A | * 12/2016 | ............... H02N 2/00 |
| JP | 2017034900 A | * 2/2017 | ............... H02N 2/00 |

* cited by examiner

*Primary Examiner* — Thomas Dougherty
(74) *Attorney, Agent, or Firm* — Cowan, Liebowitz & Latman, P.C.

(57) ABSTRACT

A vibration wave motor includes: a vibrator including a vibration plate and a piezoelectric element; a friction member frictionally contacting the vibrator; a pressing member generating a pressing force to bring the vibrator in frictional contact with the friction member; and a pressing force transmitting member between the vibrator and the pressing member to transmit the pressing force to the vibrator. The vibrator and the friction member move in a relative movement direction by an elliptical vibration, and the pressing force transmitting member includes: an engagement portion formed near a contact portion with the pressing member and engaged with the pressing member; a first restricting portion restricting movement in the relative movement direction; and a second restricting portion. restricting movement in a direction perpendicular to a pressing direction by the pressing member and the direction. The pressing force transmitting member is rotatably held with respect to the pressing member.

6 Claims, 3 Drawing Sheets

VIBRATION WAVE MOTOR

BACKGROUND OF THE INVENTION

Field of the Invention

The present invention relates to a vibration wave motor to be employed in an optical device or the like.

Description of the Related Art

Conventionally, there has been known technology, as this type of the vibration wave motor, for moving the vibrator and a friction member relatively by bringing the vibrator that causes (ultrasonic) vibration cyclically in frictional contact with a friction member. An example of this vibration wave motor that is configured in a linear motion type and is used for linear motion focus drive is disclosed in the Japanese Patent Application Laid-Open No. 2014-212682.

The prior art disclosed in the above-mentioned Japanese Patent Application Laid-Open No. 2014-212682 includes a pressing member for generating pressing force to bring the vibrator in frictional contact with a pressing force transmitting member that transmits the pressing force between the vibrator and the pressing member. The pressing force transmitting member is held rotatably in a predetermined direction so that equal pressing can be effected regardless of posture of the vibrator.

However, in the prior art disclosed in the Japanese Patent Application Laid-Open No. 2014-212682, there has been a concern that since a configuration is not sufficient to restrict pressing force by the pressing member in the pressing direction, a contact position between the pressing member and the pressing force transmitting member is shifted. If the contact portion is shifted, since uniform pressing to the vibrator cannot be effected, a new concern arises that a characteristic of the vibration wave motor is not stable.

SUMMARY OF THE INVENTION

An object of the invention is to provide a vibration wave motor by which stable pressing can be effected and that has a compact and less expensive configuration.

To achieve the above-mentioned object, a vibration wave motor of the invention includes:
- a vibrator including a vibration plate and a piezoelectric element;
- a friction member in frictional contact with the vibrator;
- a pressing member that generates a pressing force to bring the vibrator in frictional contact with the friction member; and
- a pressing force transmitting member positioned between the vibrator and the pressing member to transmit the pressing force from the pressing member to the vibrator,
- wherein the vibrator and the friction member move relatively in a relative movement direction by an elliptical vibration generated at the vibrator, and
- wherein the pressing force transmitting member includes:
  - an engagement portion that is formed near a contact portion with the pressing marcher and with which the pressing member is engaged;
  - a first restricting portion that restricts movement in the relative movement direction; and
  - a second restricting portion that restricts movement in a direction perpendicular to a pressing direction by the pressing member and the relative movement direction,
  - wherein the pressing force transmitting member is rotatably held with respect to the pressing member.

According to the invention, the contact position between the pressing member and the pressing force transmitting member is prevented from being shifted, thereby providing a vibration wave motor by which stable pressing can be effected and that has a compact and less expensive configuration.

Further features of the present invention will become apparent from the following description of exemplary embodiments with reference to the attached drawings.

DESCRIPTION OF THE EMBODIMENTS

Figure 1:
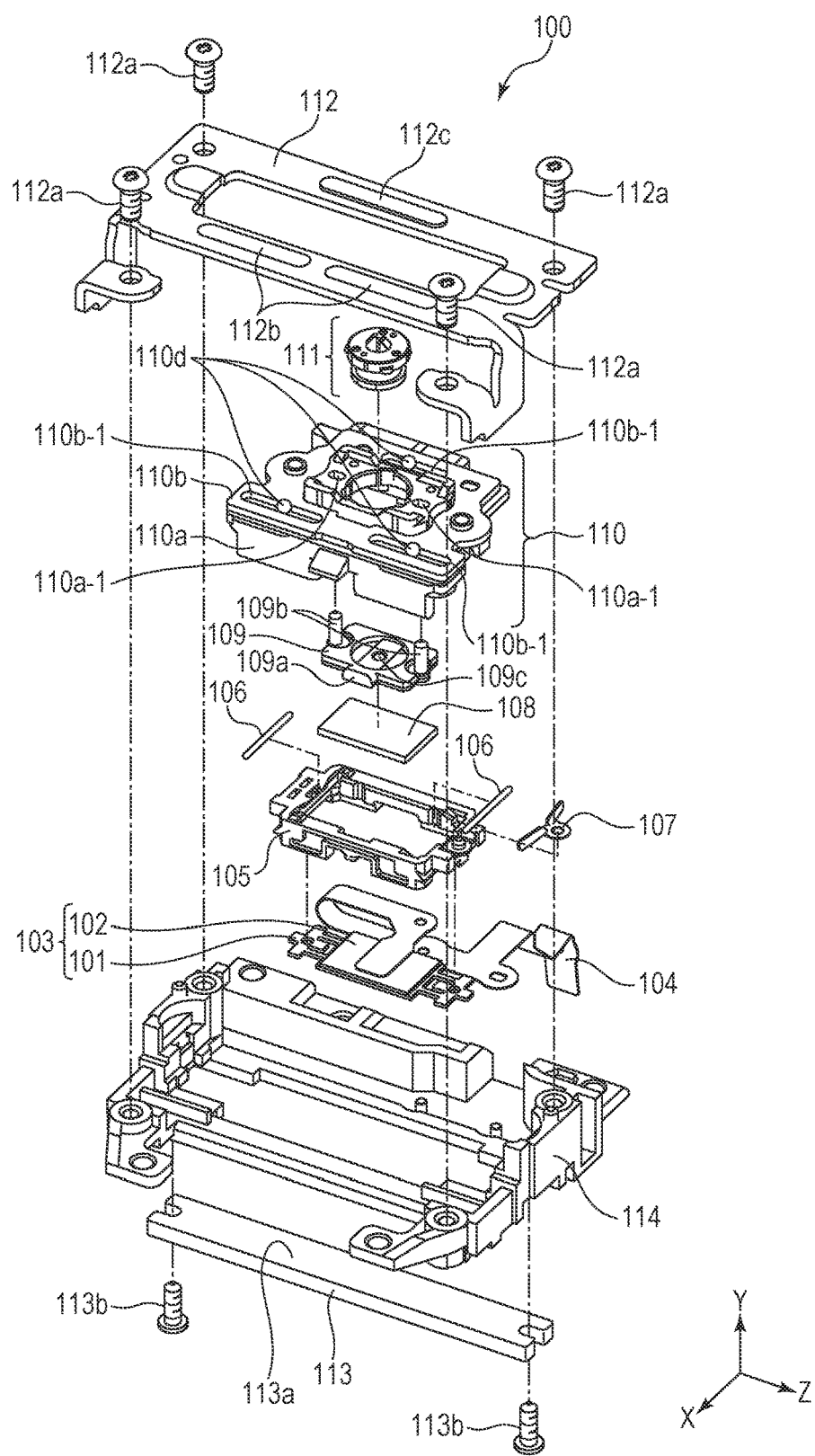
FIG. 1 is an exploded perspective view illustrating a vibration wave motor.

Basic embodiments to which the present invention is applied will be specifically described with reference to the accompanying drawings. In the drawings, the same components are denoted by the same reference numerals. It is needless to say that the following embodiments will be exemplary explained and the invention is not limited thereto.

Figure 2:
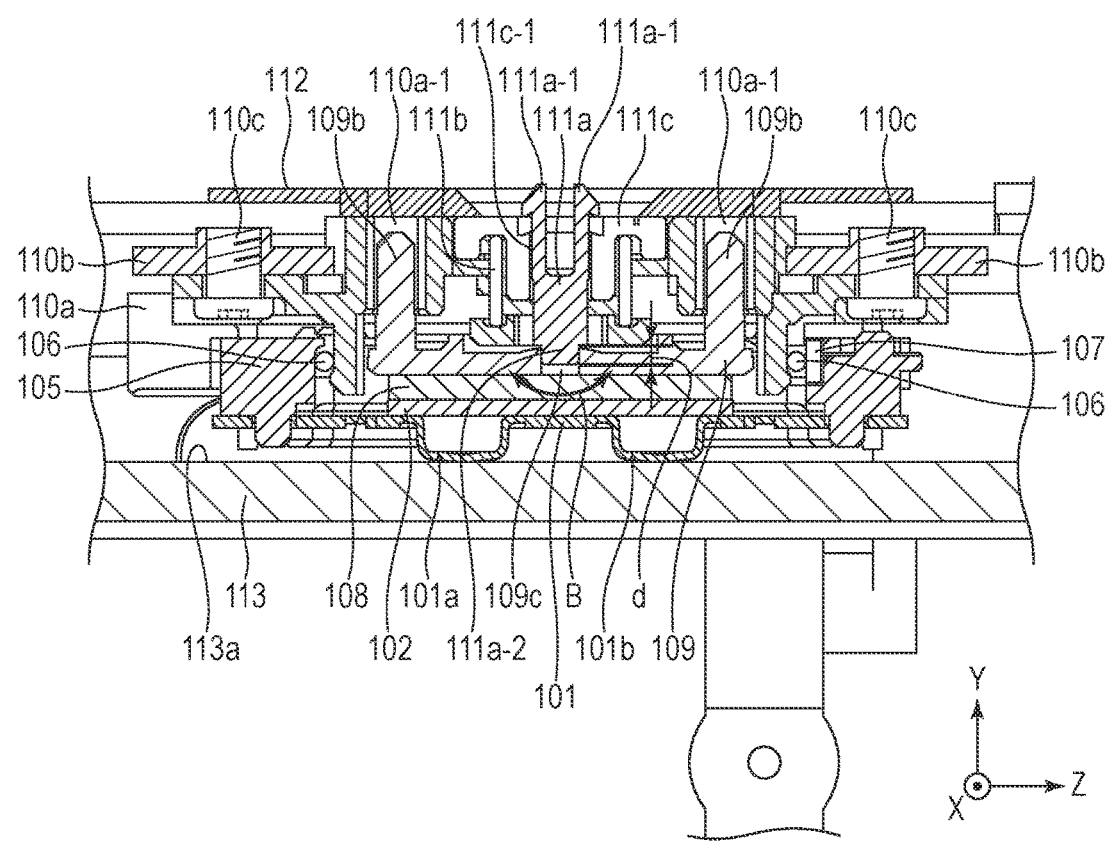
FIG. 2 is a cross sectional view of the vibration wave motor taken along a plane perpendicular to an X-axis.

FIG. 1 is an exploded perspective view illustrating a vibration wave motor. FIG. 2 is a cross sectional view of the vibration wave motor in FIG. 1 taken along a plane perpendicular to an X-axis. In FIGS. 1 and 2, when an XYZ coordination system is defined as illustrated, FIG. 2 is a cross sectional view illustrating a central portion taken along a plane perpendicular to the X-axis in a state where the vibration wave motor in FIG. 1 is assembled. A structure of the vibration wave motor will be explained using FIGS. 1 and 2. It is noted that a Y-axis direction illustrated in FIG. 1 is a pressing direction by a pressing member 111 to be described and a Z-axis is a relative movement direction of a vibrator 103 and a friction member 113 to be described below.

In FIG. 1, the vibration wave motor 100 is provided with a vibrator 103 including a vibration plate 101 and a piezoelectric element 102. The vibration plate 101 and the piezoelectric element 102 are in a state where they are fixed by glue. The vibration plate 101 and the piezoelectric element 102 constitute the vibrator 103. Further, a wiring board 104 is electrically connected with the piezoelectric element 102. The vibration plate 101 is provided with two projecting portions 101a and 101b. The two projecting portions 101a and 101b have tip ends in frictional contact with a friction contact surface 113a of the friction member 113 to be described below.

A vibrator holding member 105 holds an entirety of the vibrator 103 at both ends of the vibration plate 101. Rolling members 106 and a rolling spring member 107 are mounted on the vibrator holding member 105. A movable member 110 to be described below holds the vibrator holding member 105 through the rolling member 106 and the rolling spring member 107 such that the vibrator holding member 105 is movable in the Y-axis direction and is held in the Z-axis direction without looseness. A buffer member 108 is positioned so as to be in close contact with the piezoelectric element 102 so that vibration generated by the vibrator 103 is prevented from transmitting to other members provided on an upper portion of the buffer member 108.

The pressing force transmitting member 109 is disposed on the upper portion of the buffer member 108. The pressing force transmitting member 109 is provided with a first restricting portion 109a that restricts movement of itself in the relative movement, direction (Z-axis direction) and two axially shaped second restricting portions 109b that restrict the movement in the X-axis direction perpendicular to the pressing direction (Y-axis direction) and the relative movement direction (Z-axis direction). The first restricting portion 109a projects from a side surface in the X-axis direction of the pressing force transmitting member 109 and each of the second restricting portion 109b projects toward the movable member 110 to be described below from an upper surface of the pressing force transmitting member 109.

Further, near the center of the pressing force transmitting member 109, an engagement hole 109c (engagement portion) with which the pressing member 111 is engaged is provided close to a contact portion with the pressing member 111. The engagement hole 109c is provided at an upper portion of the pressing force transmitting member 109, correspondingly to the center of the vibrator 103 viewed from the pressing direction. In FIG. 2, it is noted that the engagement hole 109c is provided in a middle of two projecting portions 101a and 101b of the vibration plate 101 and the pressing force from the pressing member 111 to be described below is equally transmitted to the two projecting portions 101a and 101b.

The movable member 110 holds the vibrator 103, the vibrator holding member 105, the pressing force transmitting member 109 and the pressing member 111 to be described below. The movable member 110 is provided with a movable holding portion 110a that holds each member and a movable plate 110b provided at an upper portion thereof. The movable plate 110b includes three guide portions 110b-1 each having a groove shape, and each of roller balls 110d is rotatably engaged with a respective one of the guide portions 110d-1 in the respective one of the guide portions 110b-1.

The pressing member 111 generates pressing force for pressing the vibrator 103 against the friction member 113. The pressing member ill is constituted by a pressing axial portion 111a, a spring portion 11b and a fixing axis portion 111c as illustrated in FIG. 2.

A cover plate 112 is fixed to a housing member 114 to be described below by four screws 112a. Further, the cover plate 112 is provided with guide plates 112b and a guide plate 112c at positions corresponding to three guide portions 110b-1 of the movable plate 110b. And, each of three rolling balls 110d is sandwiched between a respective one of guide portions of the movable plate 110b and a respective one of those of the cover plate 112.

The friction member 113 is provided with a friction contact surface 113a that is in frictional contact with the two projecting portions 101a and 101b of the vibration plate 101. And both ends of the friction member 113 are fixed to the housing member 114 to be described. below with two screws 113b.

The housing member 114 holds the cover plate 112 and the friction member 113 and guides the movable member 110 so as to be movable in the relative movement direction (Z-axis).

The vibration wave motor 100 of the invention is constituted by the members explained above. A mechanism of pressing of the pressing member 111 and a mechanism of rotation of the pressing force transmitting member 109 will be explained below.

In FIG. 2, the pressing member 111 is constituted by the pressing axis portion 111a, the spring portion 111b and the fixing axis portion 111c. Here, the fixing axis portion 111: is installed in the movement holding portion 110a while being rotated around an axis as a rotation axis, the axis being in parallel with the Y-axis. Then, after the assembly, movement toward a positive side in the Y-axis direction (upward in FIG. 2) is restricted. On the other hand, the pressing axis portion 111a is inserted into a hold portion 111c-1 formed near the center of the fixing axis portion 111c with a claw portion 111a-1 being deformed. After the insertion, the pressing axis portion 111a becomes a fitted state with respect to the hole portion 111c-1 of the fixing axis portion 111c. Accordingly, the pressing axis portion 111a is held by the fixing axis portion 111c in a state where the pressing axis portion 111a is movable in the Y-axis direction.

The spring portion 111b is in a compressed state sandwiched between the pressing axis portions 111a and the fixing axis portion 111c. With this configuration, pressing force is generated at the pressing axis portion. 111a to a negative side (downward in FIG. 2) in the Y-axis direction and the Y-axis direction becomes the pressing direction of the invention. Further, an engagement axis 111a-2 formed at a tip end of the pressing axis portion 111a is inserted into an engagement hole 109c formed at the pressing force transmitting member 109 and becomes a fitted state. Accordingly, the pressing axis portion 111a is held at two places by the hole portion 111c-1 of the fixing axis portion 111c and the engagement hole 109c of the pressing force transmitting member 109 so that pressing can be effected stably in the Y-axis direction.

Next, the two second restricting portions 109b of the pressing force transmitting member 109 are inserted into two hole portions 110a-1 formed at the movable plate 110b of the movable member 110. Each of the hole portions 110a-1 is formed in a long hole extending in the Z-axis direction in FIG. 2. Accordingly, movement of the pressing force transmitting member 109 in only the X-axis direction (perpendicular to the relative movement direction and the pressing direction) is restricted by the second restricting portions 109b. On the other hand, as illustrated in FIG. 1, the pressing force transmitting member 109 also includes the first restricting portion 109a that restricts movement of the pressing force transmitting member 109 in the Z-axis direction (relative movement direction). This configuration will be explained using FIG. 3.

Figure 3:
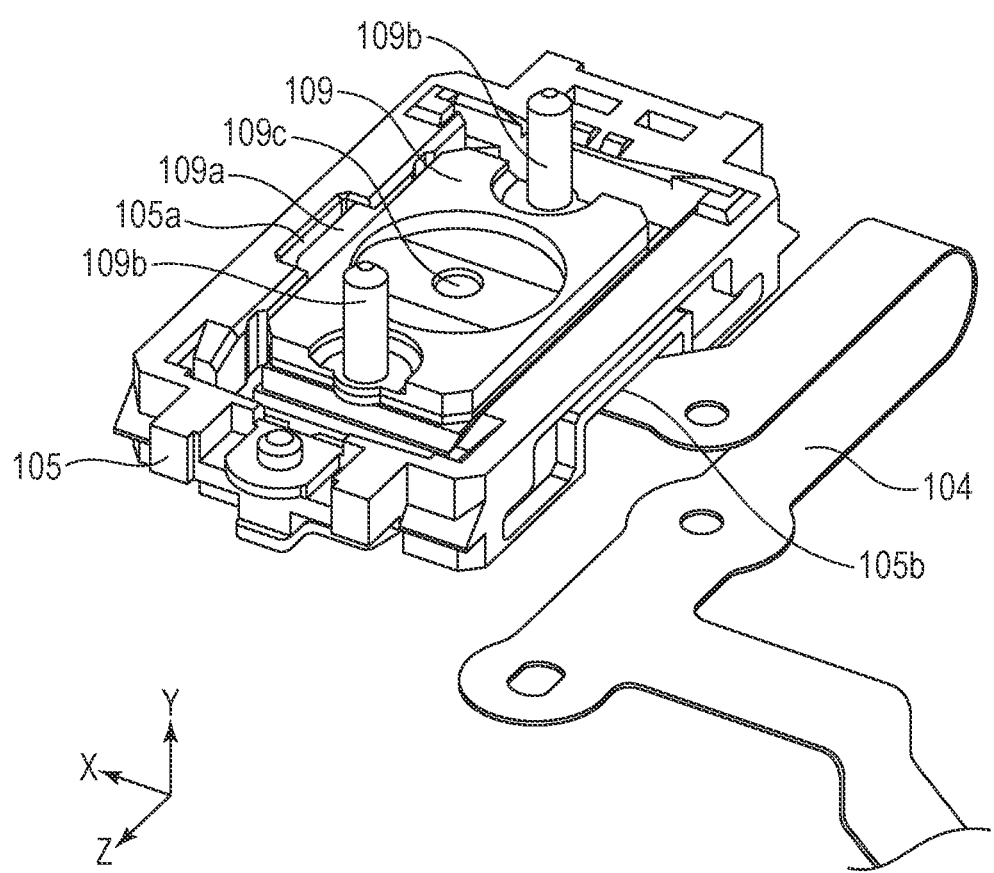
FIG. 3 is an enlarged perspective view illustrating a state where only a vibrator with which wiring board is connected and a pressing force transmitting member is installed.

FIG. 3 is an enlarged perspective view illustrating a state where only the vibrator 103 with which the wiring board 104 is connected and the pressing force transmitting member 109 are installed in a vibrator holding member 105. As illustrated in FIG. 3, the first restricting portion 109a of the pressing force transmitting member 109 fits in a recessed portion 105a formed at a side wall of the vibrator holding member 105. Accordingly, movement of the pressing force transmitting member 109 in the Z-axis direction (relative movement direction) is restricted with respect to the vibrator holding member 105. Here, the movable member 110 holds the vibrator holding member 105 through the rolling members 106 and the rolling spring member 107 in the Z-axis direction without looseness so that movement. of the pressing force transmitting member 109 in the Z-axis direction (relative movement direction) is also restricted with respect to the movable member 110.

It is noted that the wiring board 104 is extracted through a recessed extraction portion 105b formed at a side portion of the vibrator holding member 105. Here, the extraction portion 105b is provided at a position opposed to the recessed portion 105a. Accordingly, the recessed portion 105a and the extraction portion 105b can be provided at separate positions thereby improving strength of the vibrator holding member 105.

Further, the engagement hole 109c is provided in the center of the pressing force transmitting member 109. The vibrator 103 is held on a back site of the pressing force transmitting member 109 through the buffer member 108. Accordingly, the engagement hole 109c is provided in the center of the vibrator 103 viewed from the Y-axis direction (pressing direction). The engagement axis 111a-2 of the pressing axis portion 111a fits in this engagement hole 109c and pressing force is generated at this position so that the pressing force always acts on the center of the vibrator 103. With this configuration, equal pressing force can be generated at the two projecting portions 101a and 101b of the vibration plate 101 as illustrated in FIG. 2 thereby achieving stable pressing by the pressing force transmitting member 109.

With the configuration as above, the pressing force transmitting member 109 is held in a state where its movement in the X-axis direction (perpendicular to the relative movement direction and the pressing direction) and in the Z-axis direction (the relative movement direction) is restricted and has a degree of freedom in only the Y-axis direction (pressing direction). Here, the engagement hole 109c of the pressing force transmitting member 109 and the engagement axis 111a-2 of the pressing axis portion 111a are placed in a fitted state with a slight gap. Further, a fitting length is also set to be short as illustrated by a dimension d in FIG. 2 so that the tip end of the engagement axis 111a-2 is prevented from contact with an upper surface of the buffer member 108. Accordingly, the pressing force transmitting member 109 is rotatable around the engagement hole 109c in an arrow B direction of illustrated in FIG. 2. Furthermore, since the vibrator holding member 105 is also held by the movable member 110 through the rolling members 106 and the rolling spring member 107 so that the vibrator holding member 105 is not only moved in the Y-axis direction (pressing direction) but rotatable in the arrow B direction illustrated in FIG. 2.

Accordingly, even if the cover plate 112 and the friction member 113 are tilted due to manufacturing error or the like, a frictional contact state between the vibrator 103 and the fiction member 113 can be maintained. satisfactorily. Further, in a case where flatness of the frictional contact surface of the friction member 113 is poor, a contact state can be maintained satisfactorily similarly. For example, even in a case where the friction member 113 is tilted upward to the right with respect to the cover plate 112 in FIG. 2, the vibrator 103 and the vibrator holding member 105 rotate counterclockwise simultaneously and become a state where right sides thereof are raised, and the buffer member 108 and the pressing force transmitting member 109 also rotate counterclockwise correspondingly. Accordingly, the two projecting portions 101a and 101b of the vibration plate 101 are in frictional contact with the friction member 113 with equal pressing force so that stable pressing can be achieved by the pressing force transmitting member 109.

Additionally, movement of the pressing force transmitting member 109 in the Z-axis direction (relative movement direction) is restricted by the first restricting portion 109a and that in the X-axis direction. (perpendicular to the relative movement direction and the pressing direction) is restricted by the second restricting portion 109b. In such a state, the engagement axis 111a-2 of the pressing axis portion 111a that generates pressing force its in the engagement hole 109c of the pressing force transmitting member 109. Accordingly, a contact position for transmitting the pressing force between the pressing force transmitting member 109 and the pressing axis portion 111a is not shifted due to rotation of the pressing force transmitting member 109. With this configuration, the pressing force can be always transmitted to the center of the pressing force transmitting member 109 so that the pressing force also becomes transmitted to the two projecting portions 101a and 101b equally.

The vibration wave motor 100 of the invention. configured as above can achieve stable pressing with a compact and inexpensive structure. Further, a driving signal is applied to the piezoelectric element 102 through the wiring board 104 to generate an elliptical vibration in a predetermined cycle at the tip ends of the projecting portions 101a and 101b. And those projecting portions 101a and 101b are brought in frictional contact with the friction member 113 to generate driving force and move members with the movable member 110 as a center in the Z-axis direction. Linear motion drive can be achieved by connecting an object to be driven with this movable member 110.

The invention has been explained with an example of a linear motion driven vibration wave motor but it is needless to say that the invention can be applied to a rotational type of vibration wave motor. Further, the vibration wave motor may be, for example, used for an ultrasonic wave motor in which a vibration plate is caused to generate ultrasonic vibration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-108338, filed May 28, 2015, which is hereby incorporated by reference herein in its entirety.

What is claimed is:

1. A vibration wave motor comprising:
   a vibrator including a vibration plate and a piezoelectric element;
   a friction member in frictional contact with the vibrator;
   a pressing member that generates a pressing force to bring the vibrator in frictional contact with the friction member; and
   a pressing force transmitting member positioned between the vibrator and the pressing member to transmit the pressing force from the pressing member to the vibrator,
   wherein the vibrator and the friction member move relatively in a relative movement direction by an elliptical vibration generated at the vibrator, and
   wherein the pressing force transmitting member includes:
      an engagement portion that is formed near a contact portion with the pressing member and with which the pressing member is engaged;
      a first restricting portion that restricts movement in the relative movement direction; and
      a second restricting portion that restricts movement in a direction perpendicular to a pressing direction by the pressing member and the relative movement direction,
      wherein the pressing force transmitting member is rotatably held with respect to the pressing member.

2. A vibration wave motor according to claim 1, wherein the vibrator includes a wiring board electrically connected with the piezoelectric element, and wherein the first restricting portion of the pressing force transmitting member is provided on a side opposed to an extraction portion of the wiring board.

3. A vibration wave motor according to claim 1, wherein the engagement portion of the pressing force transmitting member is provided on the pressing force transmitting member corresponding to a center of the vibrator viewed from the pressing direction.

4. A vibration wave motor according to claim 1, further comprising a movable member connected with an object to be driven,
wherein the movable member holds the vibrator, the pressing force transmitting member and the pressing member, and the second restricting portion is engaged with a hole portion formed at the movable member.

5. A vibration wave motor according to claim 1, further comprising a vibrator holding member that holds the vibrator, wherein the first restricting portion fits in a recessed portion formed on a side wail of the vibrator holding member.

6. A vibration wave motor according to claim 1, wherein the oscillator wave motor is an ultrasonic wave motor that causes the vibration plate to generate ultrasonic vibration.

* * * * *